United States Patent [19]

Umeno

[11] Patent Number: 5,599,029
[45] Date of Patent: Feb. 4, 1997

[54] BOOT HAVING INWARDLY CURVED FLANKS

[75] Inventor: Seiya Umeno, Shizuoka, Japan

[73] Assignee: NOK Corporation, Tokyo, Japan

[21] Appl. No.: 542,374

[22] Filed: Oct. 12, 1995

[30] Foreign Application Priority Data

Oct. 13, 1994 [JP] Japan ..................................... 6-247947

[51] Int. Cl.⁶ ........................................................ F16D 3/84
[52] U.S. Cl. ...................................... 277/212 FB; 464/175
[58] Field of Search ........................ 277/212 FB; 464/173, 464/175; 403/50, 51; 74/18, 18.1, 18.2

[56] References Cited

U.S. PATENT DOCUMENTS

| | | | |
|---|---|---|---|
| 4,278,262 | 7/1981 | Mizutani et al. . | |
| 4,327,925 | 5/1982 | Alexander et al. . | |
| 4,730,834 | 3/1988 | Ukai et al. | 277/212 FB |
| 4,735,596 | 4/1988 | Ukai et al. | 277/212 FB |
| 4,786,272 | 11/1988 | Baker | 277/212 FB |
| 4,923,432 | 5/1990 | Porter | 277/212 FB |
| 5,027,665 | 7/1991 | Hayward . | |
| 5,078,652 | 1/1992 | Baker | 277/212 FB |
| 5,308,091 | 5/1994 | Mihalcin | 277/212 FB |

FOREIGN PATENT DOCUMENTS

| | | | |
|---|---|---|---|
| 2505542 | 8/1976 | Germany | 277/212 FB |
| 63-196863 | 12/1988 | Japan . | |
| 1-131024 | 9/1989 | Japan . | |
| 4-111958 | 9/1992 | Japan . | |
| 85/05422 | 12/1985 | WIPO | 464/175 |

*Primary Examiner*—Scott Cummings
*Attorney, Agent, or Firm*—Jacobson, Price, Holman & Stern, PLLC

[57] ABSTRACT

A universal joint boot having a high degree of ability to withstand radial expansion. The boot (10) includes a bellows structure (16) having alternating ridges (26) and valleys (28) interconnected by flank portions (30). The flank portions (30) are curved inwardly of the boot and have a varying wall thickness that increases from the ridges (26) toward the valley (28). The valley portion (28) is defined by a U-shaped annular groove (34) to reduce the wall thickness thereby to improve the flexibility.

7 Claims, 3 Drawing Sheets

5,599,029

BOOT HAVING INWARDLY CURVED FLANKS

BACKGROUND OF THE INVENTION

1. Field of the Invention

The present invention relates to a boot for a universal joint such as a constant velocity universal joint of an automobile.

2. Description of the Prior Art

Universal joints are protected by rubber boots that prevent ingress of dusts and dirt. Rubber boots also serve to confine a lubricant such as grease applied to the moving parts of the universal joints.

As is well-known, the universal joint boot is alternately subjected to expansion and contraction for each revolution of the universal joint because the two axes of the universal joint are intersected at an angle with one another. In addition, the boot is subjected to an inner air pressure resulting from the temperature rise as well as to a substantial centrifugal force resulting from the rotation of the boot. Often, a high and uneven centrifugal force is exerted on the boot due to the presence of the mass of grease adhering to the inner wall of the boot. Under high revolutionary speeds, the boot is expanded radially outwardly by the increased centrifugal force. If the radial expansion is excessive, there is a danger of the boot being damaged or broken due to contact with the ground or with other parts of the automobile.

U.S. Pat. No. 4,278,262 to Mizutani et al. discloses a rubber boot wherein the wall thickness of a valley portion, and the portions adjacent thereto, of the bellows structure is increased in order to restrain the radial expansion of the boot.

While this design is advantageous in reducing the undesirable radial expansion of the bellows structure, the problem is that the flexibility of the valley portion is sacrificed so that a stress is concentrated at the valley portion when the boot is subjected to repeated cycles of expansion and contraction. This gives rise to the formation of cracks and fissures at the valley portion thereby resulting in a premature breakage of the boot.

The stress concentration is particularly significant when the boot is made of a thermoplastic elastomer material in order to improve the weather resistance of the boot, because a thermoplastic elastomer material has much less elasticity than a rubber material.

Accordingly, an object of the present invention is to provide an improved boot for a universal joint.

Another object of the invention is to provide a universal joint boot which has a high degree of ability to withstand the centrifugal force and which is yet capable of avoiding the concentration of stress at the valley portions of the boot.

A still another object of the invention is to provide a universal joint boot which is capable of restraining the radial expansion of the boot due to the centrifugal force and which has an improved durability and a prolonged service life.

A further object of the invention is to provide a universal joint boot which has an improved weather resistance and which is capable of being manufactured at a low cost.

Another object of the invention is to provide a universal joint boot which has a controlled wall thickness and which is suitable for manufacture by blow molding of a thermoplastic elastomer material.

SUMMARY OF THE INVENTION

According to the invention, the universal joint boot includes a bellows structure having a plurality of alternating ridge and valley portions, with adjacent ridge and valley portions being interconnected respectively by flank or intermediate portions.

The feature of the present invention is that the flank portions are curved inwardly of the boot, that the flank portions have a varying wall thickness which increases from the ridge portions toward the valley portions, and that the valley portions have a reduced wall thickness smaller than the wall thickness of the regions of the flank portions immediately adjacent the valley portions.

The inwardly curved flank portions, in combination with the flank wall thickness gradationally increasing toward the valley portions, affords the boot with the ability to withstand against the centrifugal force and the inner air pressure. The reduced wall thickness at the valley portions increases the flexibility of the valley portions and permits the adjacent flank portions to readily open and close in response to expansion and contraction of the bellows, without involving undue stress concentration at the valley portions. Consequently, the radial expansion of the boot is effectively prevented while avoiding the formation of cracks for a prolonged service life of the boot.

In a preferred embodiment of the invention, the boot is made of a thermoplastic elastomer material. Use of the thermoplastic elastomer material is advantageous since the weather resistance, particularly the resistivity against ozone attack, is substantially enhanced as compared with a rubber material.

Preferably, the outer periphery of the valley portion is provided with an annular groove, preferably of a U-shaped cross-section, that defines the reduced wall thickness. This design facilitates control of the wall thickness of the valley portions when the boot is manufactured by blow molding of a thermoplastic elastomer material.

These features and advantages of the invention as well as other features and advantages thereof will become apparent from the following description.

BRIEF DESCRIPTION OF THE DRAWINGS

Throughout different drawings, similar parts and members are designated by like reference numerals.

DESCRIPTION OF THE PREFERRED EMBODIMENTS

Figure 1:
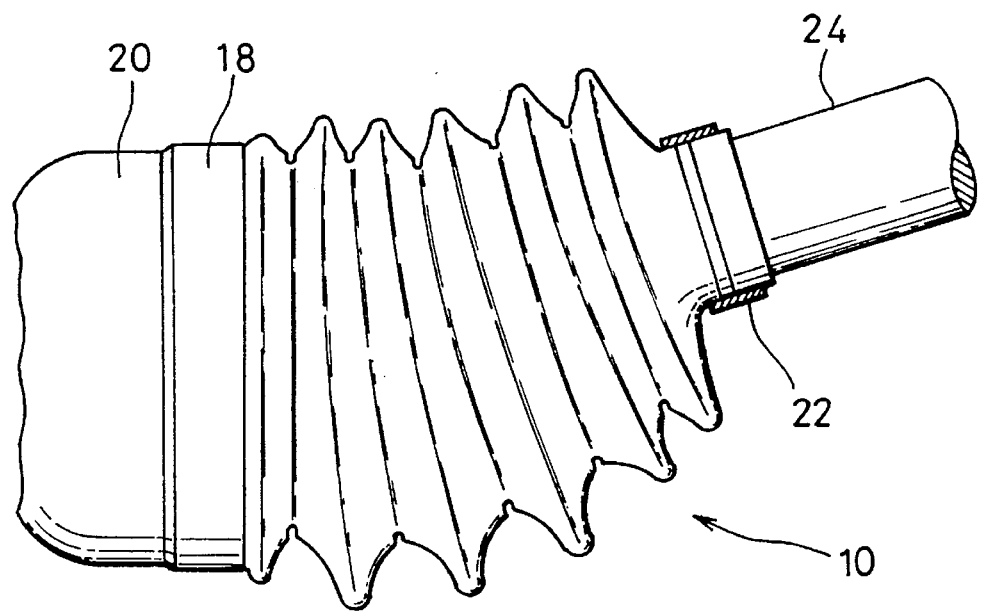
FIG. 1 illustrates the boot according to the invention as mounted to a constant velocity universal joint of an automobile.
Figure 2:
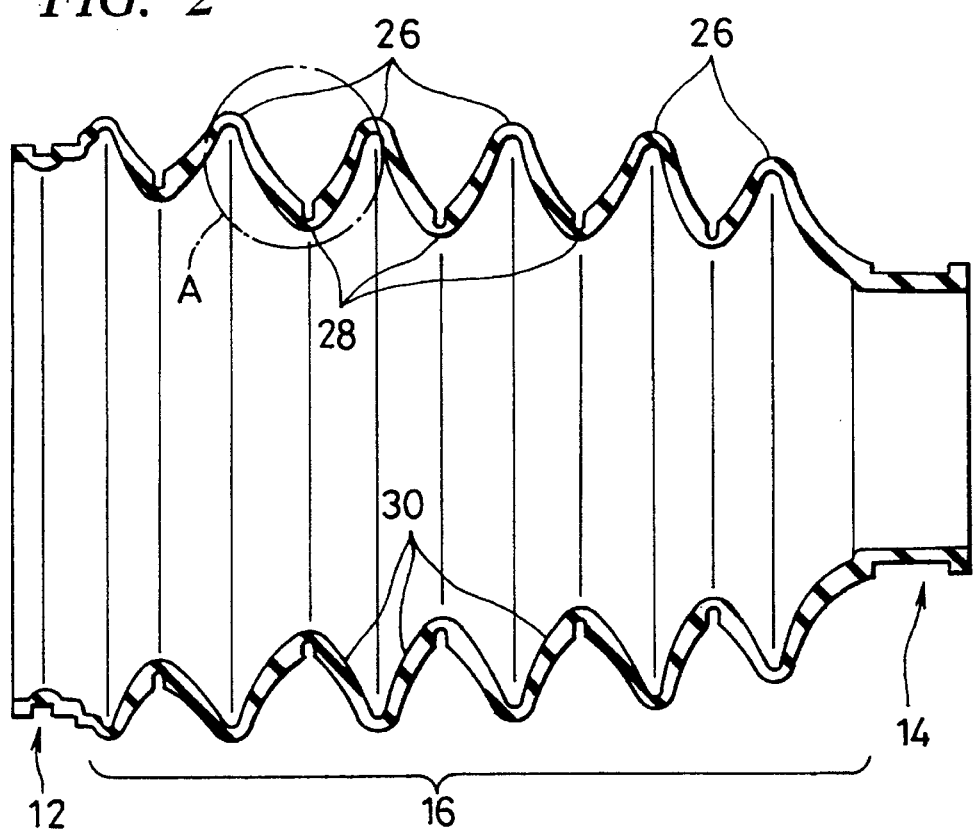
FIG. 2 is a cross-sectional view of the boot shown in FIG. 1.

Referring to FIGS. 1 and 2, the boot 10 has a large diameter end 12 and a small diameter end 14 which are connected by an intermediate bellows structure 16. In use, the large diameter end 12 may, for example, be fastened by a boot band 18 to an outer casing 20 of a constant velocity universal joint, with the small diameter end 14 being fastened by another band 22 to a drive shaft 24 of the joint, as shown in FIG. 1.

In the illustrated embodiment, the bellows structure 16 includes six ridge portions 26 and five valley portions 28 interconnected with one another by flank portions 30.

Figure 3:
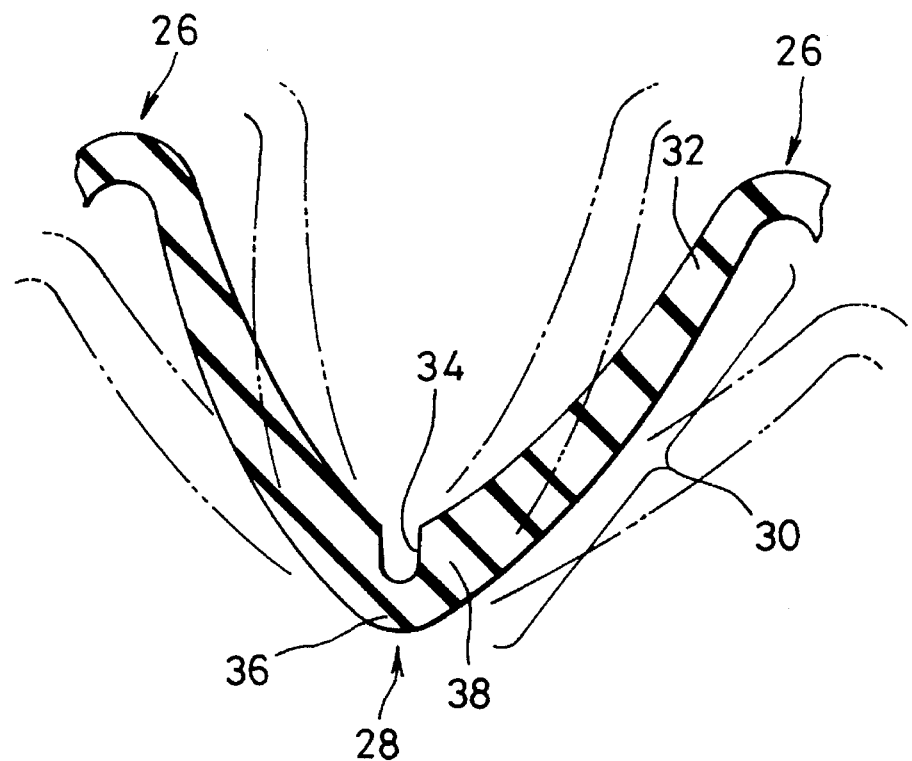
FIG. 3 is an enlarged cross-sectional view showing a part of the boot encircled by the circle A in FIG. 2.

As shown enlarged in FIG. 3, the flank portion 30 is curved inwardly of the boot with respect to the generatrix tangential to the ridge and valley portions 26 and 28.

The ridge portion 26 has a controlled, given wall thickness. The upper part 32 of the flank portion 30 is smoothly merged into the ridge portion 26. The flank portion 30 has a gradational wall thickness that increases from the ridge portion 26 toward the valley portion 28.

An annular groove 34 of a U-shaped cross-section is formed in the valley portion 28 along the circumferential outer periphery thereof to define a wall 36 of an arcuated or semicircular cross-section. Accordingly, the parts 38 of the flank portions 30 immediately adjacent the valley portion 28 have a maximum wall thickness. The annular groove 34 serves as means for increasing the flexibility of the valley portion 28.

The wall 36 of the valley portion 28 has a controlled wall thickness which may be roughly equal to or slightly greater than the thickness of the ridge portion 26.

The boot 10 according to the invention may be made by injection molding of a rubber material. In view of the poor ozone resistance of a rubber material, however, the boot is preferably made of a thermoplastic elastomer material, such as a copolymer of polyester, which has a much higher weather resistance. Molding of a thermoplastic elastomer material may be carried out either by injection molding or blow molding. However, use of blow molding process is preferable since the time required for a cycle of blow molding is shorter than that of injection molding and because blow molding can be carried out at a lower cost.

Figure 4:
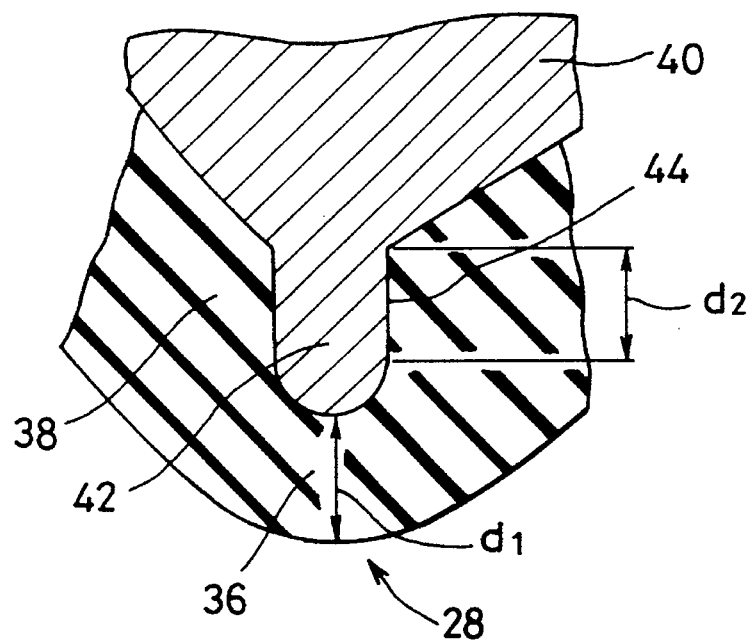
FIG. 4 is an enlarged cross-sectional view showing a part of the boot during blow molding.

When the boot 10 is manufactured by blow molding of a thermoplastic elastomer material, a mold 40 having an annular bead 42 of a U-shaped cross-section may be used, as shown in FIG. 4. The U-shaped cross-section of the annular bead 42 is defined by a pair of opposite straight sides 44 and an arcuated bottom. The thickness $d_1$ of the wall 36 of the valley portion 28 may be readily controlled by determining the length $d_2$ of the straight sides 44 of the U of the annular bead 42 and by controlling the wall thickness of a parison.

When mounted to a universal joint, the bellows structure 16 will be alternately subjected to compression and expansion in response to the rotation of the joint, as will be apparent from FIG. 1. As the wall 36 of the valley portion 28 has a controlled reduced thickness, the valley portion 28 presents an adequate flexibility to enable the adjacent flank portions 30 to readily open and close, as shown by the ghost lines in FIG. 3, without causing stress concentration at the valley portion.

The increased wall thickness at the inner regions 38 of the flank portions 30 adds to the rigidity of that regions so that the inner regions 38 provide a good support for the ridge portions 26 and are able to withstand the centrifugal force acting on the ridge portions 26 which are subjected to the maximum centrifugal force. The inward curve of the flank portions 30 concerts with the increasing wall thickness to further enhance the resistivity again the centrifugal force.

Figure 5:
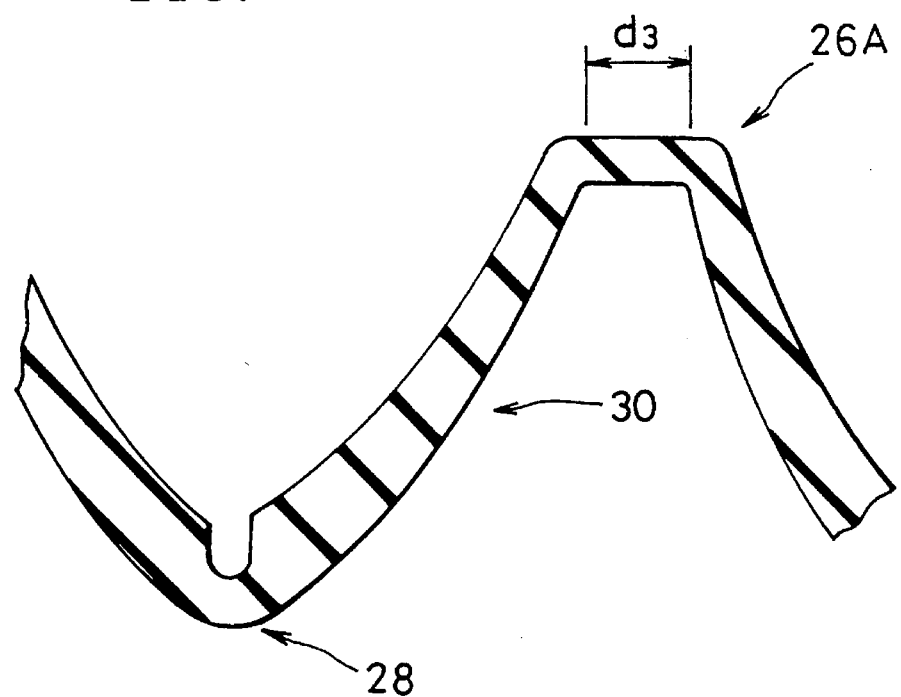
FIG. 5 is an enlarged cross-sectional view showing a modified cross-section of the ridge portion; and, FIG. 6 is a view, partly in cross-section, of the boot according to another embodiment of the invention.

In FIG. 5, there is shown a modified cross-section of the ridge portions. As shown, the ridge portions 26A are made flat for a predetermined axial length $d_3$. This arrangement is advantageous in that the centrifugal force acting on the inner periphery of the ridge portion due to the mass of grease adhering thereto is distributed axially over the length $d_3$ so that the radial expansion of the boot is further reduced.

Figure 6:
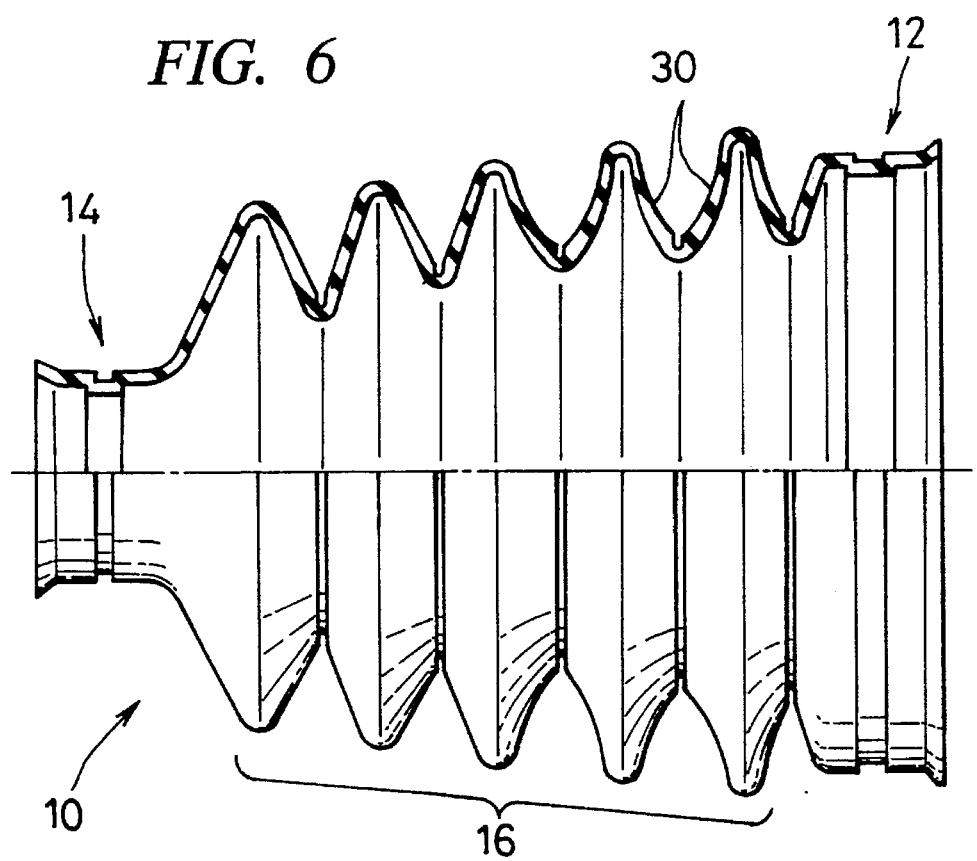

FIG. 6 illustrates another embodiment of the invention. Parts and members similar to those of the foregoing embodiment are designated by like reference numerals and will not be described again. In this embodiment, the second to sixth flank portions 30, which are contiguous to the large diameter end 12 and which are therefore subjected to a greater centrifugal force, are inwardly curved and are provided with a wall thickness increasing toward the valley portions. Other flank portions have a constant wall thickness and a generally straight cross-section.

While the present invention has been described herein with reference to the specific embodiments thereof, it is contemplated that the invention is not limited thereby and various modifications and alterations may be made therein without departing from the scope of the invention.

What is claimed is:

1. A boot for a universal joint having two rotatable members, said boot comprising:

a first end for engagement with one of said rotatable members, a second end for engagement with the other of said rotatable members, and a resilient bellows structure hermetically interconnecting said first and second ends;

said bellows structure having a plurality of alternating ridge and valley portions, with adjacent ridge and valley portions being interconnected by flank portions;

said flank portions adjacent to one or more of said valley portions being curved inwardly of the boot so as to withstand against a centrifugal force acting radially outwardly on said bellows structure;

said flank portions adjacent to said one or more valley portions having a varying wall thickness that increases from said ridge portions toward said valley portions;

said one or more valley portions having a reduced wall thickness smaller than the wall thickness of the regions of said flank portions immediately adjacent said one or more valley portions.

2. A boot according to claim 1, wherein said boot is made of a thermoplastic elastomer material to provide an improved weather resistance.

3. A boot according to claim 2, wherein the outer periphery of each of said one or more valley portions is provided with an annular groove defining said reduced wall thickness.

4. A boot according to claim 3, wherein said groove has a U-shaped cross-section having straight sides and an arcuated bottom.

5. A boot according to claim 1, wherein said ridge portions are made flat for a predetermined axial length.

6. A boot for a constant velocity universal joint having an outer casing and a drive shaft, said boot comprising:

a first end for engagement with said outer casing, a second end for engagement with said drive shaft, and a resilient bellows structure hermetically interconnecting said first and second ends;

said bellows structure having a plurality of alternating ridge and valley portions, with adjacent ridge and valley portions being interconnected by flank portions;

said boot being made of a thermoplastic elastomer material;

said flank portions being curved inwardly of the boot so as to withstand against a centrifugal force acting radially outwardly on said bellows structure;

said flank portions having a varying wall thickness that increases from said ridge portions toward said valley portions;

the outer periphery of each of said valley portions being provided with an annular groove to provide a reduced wall thickness smaller than the wall thickness of the regions of said flank portions immediately adjacent said valley portions.

7. A boot for a constant velocity universal joint having an outer casing and a drive shaft, said boot comprising:

a first end for engagement with said outer casing, a second end for engagement with said drive shaft, and a resilient bellows structure hermetically interconnecting said first and second ends;

said bellows structure having a plurality of alternating ridge and valley portions, with adjacent ridge and valley portions being interconnected by flank portions;

said boot being made of a thermoplastic elastomer material;

said flank portions being curved inwardly of the boot so as to withstand against a centrifugal force acting radially outwardly on said bellows structure;

said flank portions having a varying wall thickness that increases from said ridge portions toward said valley portions;

said valley portions being provided with means for increasing the flexibility of said valley portions.

* * * * *